Jan. 1, 1963
P. A. DE LEON
3,070,935
WATER DEGASIFIER
Filed Aug. 10, 1959
2 Sheets-Sheet 1
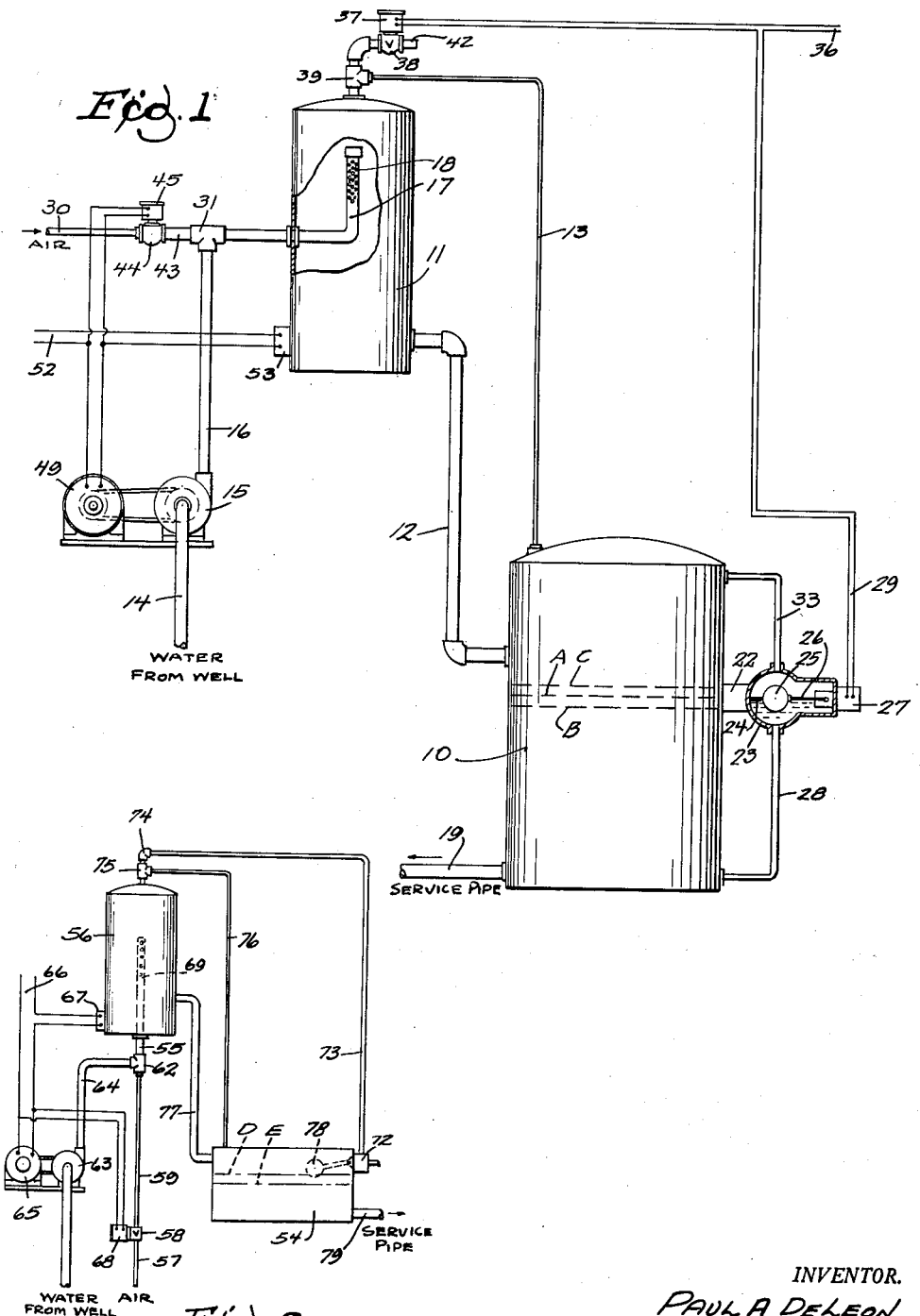
INVENTOR.
PAUL A. DE LEON
BY
Wheeler, Wheeler & Wheeler
ATTORNEYS Jan. 1, 1963

P. A. DE LEON 3,070,935

WATER DEGASIFIER

Filed Aug. 10, 1959

INVENTOR.
PAUL A. DE LEON
BY
Wheeler, Wheeler & Wheeler
ATTORNEYS

United States Patent Office 3,070,935
Patented Jan. 1, 1963

3,070,935
WATER DEGASIFIER
Paul A. De Leon, Estero, Fla., assignor to De Leon Methods, Inc., Naples, Fla., a corporation of Florida
Filed Aug. 10, 1959, Ser. No. 832,830
13 Claims. (Cl. 55—170)

This invention relates to a water degasifier.

In certain sections of the United States, particularly in the state of Florida, well water is heavily laden with foreign gases, such as hydrogen sulfide gas, marsh gas and the like. Many expedients have been adopted to remove the contaminating gases from the water. A recent example of one of said expedients is described in United States Patent 2,811,258 in which the water is aerated in an attempt to oxidize the contaminating gases. However, aeration is sometimes objectionable because the aerated and oxygenized water is subject to the rapid propagation of algae and worm life, etc.

The device of the present invention removes foreign gases from water in an entirely closed pressurized system which does not depend upon aeration, but simply upon exposure of finely divided gas laden water particles to an external pressure less than the vapor pressure of the foreign gases within such particles. The foreign gases, together with their unpleasant odors, are thus discharged or released from the water particles under their own vapor pressure and without creating any condition which might enhance the propagation of animal and plant life.

Once removed from the water particles, the foreign gases will not tend to be re-absorbed into the water which collects in a sump. Such foreign gases are removed from the closed system by periodically venting the system in cycles which are related to the demand for water. In practice the gas laden water will be admitted to the system and foreign gases will be concurrently vented therefrom in cycles averaging from five to fifteen seconds in duration. The time duration of the cycles is automatically determined by the pressure conditions within the system. The cycle will be initiated in response to demand for water which lowers the level of water in a storage tank and will be terminated when the level of water in a storage tank is restored.

The device of the present invention does not require any changes in the well or water supply, the pumping equipment, or the service piping.

Other objects, features and advantages of the invention will appear from the following disclosure in which:

FIG. 1 is a diagrammatic view in side elevation of one embodiment of the invention.

FIG. 2 is a diagrammatic view in side elevation of another embodiment of the invention.

Figure 3:
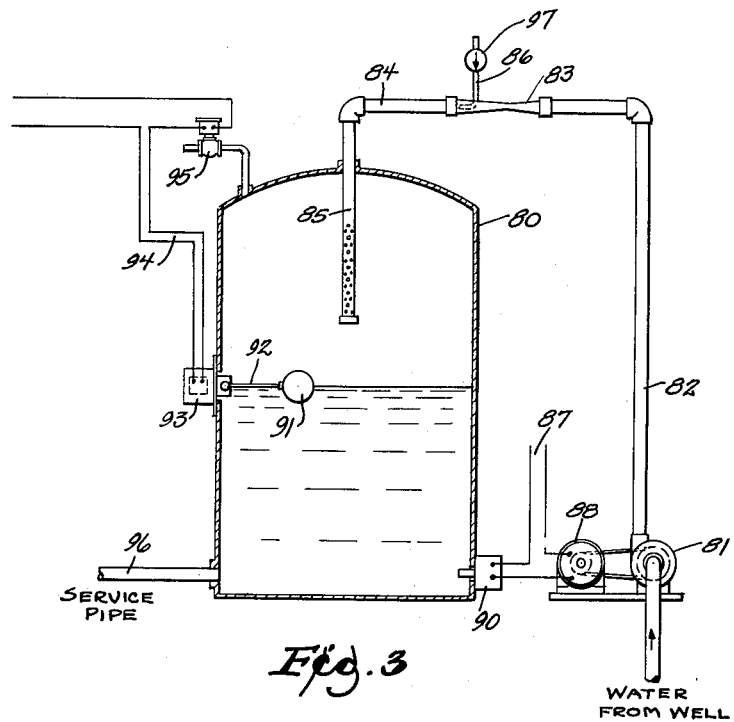
FIG. 3 is a diagrammatic view in side elevation of still another embodiment of the invention.

In the embodiment of the invention shown in FIG. 1, there is a storage tank 10 and a separator tank 11 which is elevated above the storage tank, desirably about 24 inches above the water level in the storage tank. The respective tanks 10 and 11 are interconnected by a water line 12 and a gas line 13.

Gas laden water is drawn from a well (not shown) by the pipe 14 which supplies pump 15, the output fitting of which feeds line 16 which is connected to the separator tube 17 within the separator tank 11. The separator tube 17 is provided with perforations or apertures 18 having a total effective cross section which is desirably in the range of 80 to 90 percent of the cross section of the tube 17.

Gas free water is withdrawn from the device through the service pipe 19 which is tapped into the bottom of the storage tank 10. The mean or normal level of gas free water within the storage tank 10 is indicated at A. A lower level of water in the tank is indicated at B and a higher level at C. Externally of the storage tank 10 and mounted on the support bracket 22 is a float chamber 23 connected by the tubes 28, 33 to the storage tank 10. Accordingly, water will stand in the chamber 23 at a level 24 which will correspond to the level of the water in the storage tank 10.

Within the chamber 23 there is a float 25 having an arm 26 connected in actuating relationship to an electric switch 27 in circuit with the line 29 which is in series circuit with electric power line 36 connected to solenoid 37 which actuates the valve 38 in vent pipe 42. Valve 38 and vent pipe 42 are connected through a T-fitting 39 to the gas space at the top of separator tank 11. T-fitting 39 provides a convenient connection for gas line 13 which interconnects the tops of the two tanks 10 and 11. Valve 38 vents foreign gases from the system to the atmosphere in a cycle responsive to the level of water in tank 10.

Water pump 15 is actuated by an electric motor 49 in a circuit to power line 52 which includes a pressure control switch 53 responsive to the pressure within the separator tank 11. By way of example, control 53 may be set to energize motor 49 when the pressure in separator tank 11 drops below 20 p.s.i. and to de-energize the motor 49 when the pressure in the tank 11 rises to 40 p.s.i.

Air is admitted to the system from a source 30 of compressed air tapped into the water pipe 16 through a T-coupling 31 through a pipe 43 in which there is a valve 44 controlled by the solenoid valve actuator 45 connected electrically in parallel with the motor 49. Accordingly, whenever the pressure against switch 53 is low enough to start the pump 15, valve 44 will also open to admit air under the pressure of the source 30 into the water which is supplied by the pump to the separator tank 11. This air replaces the foreign gases which are vented from the system and keeps the system from becoming water-logged.

The operation of the device shown in FIG. 1 is as follows:

Assuming that the water in storage tank 10 is at its mean level A, the level 24 of the water in float chamber 23 will be such that the switch 27 is open to de-energize solenoid 37 and leave valve 38 normally closed. Gas pressure within the separator tank 11 is above 40 p.s.i. and hence motor 49 will be de-actuated and the pump 15 will be inactive. This is the normal state of affairs when no water is being drawn through pipe 19.

If water is now drawn through pipe 19, the water in the storage tank 10 will drop to a lower level, for example, level B. This will lower the level 24 of water in the float chamber 23 to start an operating cycle in which the float 25 will drop to close switch 27, thus to actuate solenoid 37 and open valve 38 to vent the separator tank 11 to the atmosphere. As soon as the pressure in tank 11 drops below 20 p.s.i., switch 53 will close to energize motor 49, start the pump 15 and deliver gas laden water from the well into the separator tank 11. Such water will be jetted or sprayed through the apertures 18 of the tube 17 towards and against the side walls of the separator tank 11 and will result in breaking up the water into small particles.

The surface tension of such particles is low enough so that the vapor pressure of the foreign gases absorbed in the water will discharge such gases from the water particles into the separator tank 11 and out into the atmosphere through the now open valve 38. Water from which the foreign gases are thus removed will collect at the bottom of the tank 11 and will flow into the storage tank 10 through the pipe 12.

At the same valve 44 will open to admit air into the separator 11 to replace the foreign gases vented through valve 38. By admitting such air through pipe 17 aeration and atomization of water discharged through perforations 18 is promoted.

Pump 15 has a greater capacity than pipe 19. Accordingly, the water in storage tank 10 will shortly rise to the level indicated at C. This will lift the float 25 in float chamber 23 to open switch 27, thus de-energizing solenoid 37 and permitting valve 38 to close.

Under these circumstances the gas pressure in the system will rapidly rise above 40 p.s.i., thus to de-energize motor 49, stop the pump 15 and close valve 44. The apparatus has now completed one full cycle and the system is now again in balance. During the cycle just described, gas laden water was admitted to the separator tank, foreign gases were discharged from the water and vented to the atmosphere and gas free water was admitted to storage tank from separator tank 11. The system is now in readiness for a repeated cycle responsive to the level of the water in storage tank 10.

The air line 13 which interconnects the two tanks 10 and 11 is desirably restricted sufficiently to introduce time delay between equalization of the gas pressures in the two tanks. Accordingly, water from which the gas has been released in separator tank 11 and which will accumulate in the bottom of tank 11 will not tend to flow as freely from the separator tank 11 into the storage tank 10 as it might otherwise be able to if the line 13 were larger. The restriction in line 13, the excess capacity of pump 15 over the capacity of line 19 and the rate of gas discharge through vent pipe 42 all bear on the duration of the cycle aforesaid which in practice will last anywhere from four to fifteen seconds. By way of example and not of limitation, the compressed air line is connected to a source of air pressure at 42 p.s.i. When valve 44 is open, the air will enter pipe 16 at a rate of about .75 to 1.0 c.f.m. The line 13 in this example may be ¼ inch internal diameter for a cycle of four to fifteen seconds.

In FIG. 2 a modified embodiment of the invention is illustrated. Features of all embodiments may be interchangeably used if desired. In the FIG. 2 embodiment the storage tank 54 is horizontally disposed and the water supply pipe 55 for the separator tank 56 comes in from the bottom of the tank, instead of from its side, as is shown in FIG. 1. Moreover, in the device shown in FIG. 2, the compressed air from pipe 57 is supplied under the control of valve 58 through pipe 59 into T-coupling 62 where it mixes with the gas laden water supplied by pump 63 through pipe 64.

In the FIG. 2 embodiment of the invention, pump 63 is powered by the motor 65 which is supplied with electric power through the line 66. As in the first described embodiment, motor 65 is controlled by pressure controller 67 responsive to the pressure within the separating tank 56. The pressure controller 67 also is in circuit with the solenoid operator 68 for valve 58 in the compressed air line 57. Accordingly, whenever the pump 63 is actuated to supply water to the spray tube 69 within separator tank 56, compressed air is concurrently supplied and is mixed with the water in the coupling 62. The intermixture of compressed air and gas laden water helps atomize the water in the separator tank 56 for release of foreign gases therefrom.

In the FIG. 2 embodiment of the invention, foreign gas discharged from the water in the separator tank 56 is vented from the separator tank 56 through valve 72 connected by line 73 to elbow 74 which communicates with the separator 56 through the T-coupling 75. The T-coupling 75 also couples with the storage tank 54. As in the prior described embodiment, the respective tanks 54, 56 are connected by a water pipe 77.

Valve 72 is actuated by the float 78 in storage tank 54. Accordingly, foreign gas is vented from the separator tank 56 in response to the level of water in the storage tank in much the same manner as in the embodiment of the invention shown in FIG. 1. However, valve 72 in the FIG. 4 embodiment is controlled mechanically, as distinguished from the remote electrical system of FIG. 1.

Water is drawn to the point of use through the service pipe 79. The cycle of FIG. 2 embodiment of the invention is substantially the same as in the device shown in FIG. 1. For example:

Assume that the water in storage tank 54 is at its normal level D in which the valve 72 is closed, gas pressure within the separator tank 56 is above 40 p.s.i. and pump 63 is inactive. If water is now drawn through service pipe 79, water in the storage tank 54 will drop to a lower level, for example, level E. Float 78 will drop with the water level to mechanically open the vent valve 72 to release gas from separator tank 56 through valve 72. Pressure within the separator tank 56 will accordingly drop and when below 20 p.s.i., switch 67 will energize motor 65 and will also actuate solenoid 68 to open air valve 58. Water laden with foreign gases and intermixed with compressed air will now be jetted through the perforated pipe 69 into and against the side of the separator tank 56 and the foreign gases will be discharged from the atomized particles thereof as aforestated. Gas free water will flow into the storage tank 54 through pipe 77 at a faster rate than it is being withdrawn therefrom through service pipe 79. The rising level of water will lift float 78 back to level D and valve 72 will close. The continued interflux of water and compressed air through the pipe 69 will increase the pressure within the system above 40 p.s.i. and the pump 63 will shut down and valve 58 will close. The system has now gone through a complete cycle and is in readiness for a renewed cycle if service pipe 79 continues to remove water from the tank 54. The length of the cycle depends upon the rate of flow through pipe 79, the size of pipe 77 and the flow restricting effect of equalizer line 76.

Figure 4:
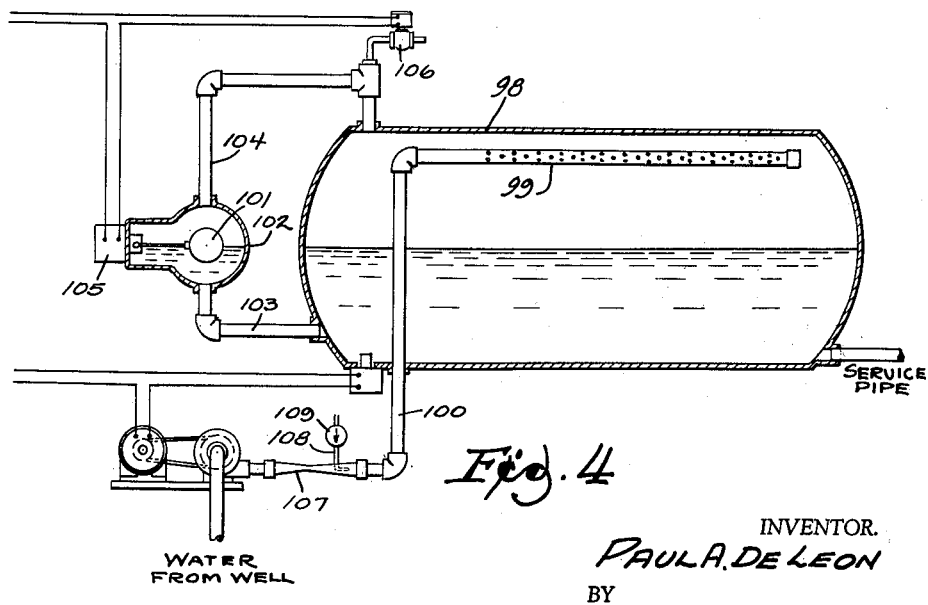
FIG. 4 is a diagrammatic view in side elevation of a still further embodiment of the invention.

The embodiments of the invention shown in FIGS. 3 and 4 are quite similar to the embodiments shown in FIG. 1, except that in FIGS. 3 and 4, the respective separator and storage tanks are integrated. In FIG. 3 the upright tank 80 is supplied with water by pump 81 and through a line 82 which is connected through a venturi tube 83 and pipe 84 into perforated pipe 85 at the top of tank 80. In lieu of the valve arrangement for admitting additional air into the tank, such as is shown at 44 of FIG. 1 and 68 of FIG. 2, this embodiment of the invention is provided with an air inspirating inlet pipe 86 at the outlet side of the neck of the venturi tube 83 and into which atmospheric air is drawn through check valve 97 whenever the pump 81 supplies water to the tank 80. Pump 81 is provided with a pressure sensitive control valve 90 in the electric circuit 87 to the pump motor 88.

In this embodiment of the invention the float 91 may be disposed within the tank 80 and has an arm 92 which actuates the switch 93 in the electric circuit 94 to solenoid actuated valve 95 at the top of the tank 80 and which will vent the tank when the switch is closed, pursuant to the lowering of the level of the water within the tank.

In this embodiment when water is drawn through the service pipe 96, thus to lower the level in the tank 80, float 91 drops to close switch 93, which thus actuates the solenoid operated valve 95 to open the valve and vent the tank to the atmosphere. As soon as the pressure in the tank drops to 20 p.s.i. for example, switch 90 will close to energize the pump motor 88 and supply gas laden water to the separator pipe 85 and at the same time aspirate fresh air through the intake tube 86 in the venturi 83. Thus air surcharged gas laden water will be sprayed through the perforated pipe 85 to result in separation of the foreign gases therefrom as aforesaid.

The pump supplies water at a faster rate than is drawn out of service pipe 96. Accordingly, the level of gas free water in the tank 80 will rise to lift float 91 ultimately to open the switch 93 to close the solenoid valve 95 through which foreign gases have been escaping from the system. As soon as the valve 95 closes, the pressure will rapidly build up in the tank 30 to 40 p.s.i. or more, whereupon switch 86 will open to stop the pump motor 88. The device has then gone through a complete cycle and is in readiness for an additional cycle, which will be started in response to demand for water.

A very similar arrangement is shown in FIG. 4, the principal difference being that the tank 98 is horizontal instead of vertical the separator tube 99 within the tank is connected to the water line 100 through a bottom wall of the tank 98 instead of through its top, as in the device shown in FIG. 3. Moreover, float 101 is mounted in a float chamber 102 which is external of the tank 98 and is connected thereto by pipes 103, 104, rather similar to the disclosure of FIG. 1. Float 101 actuates switch 105 in circuit to the solenoid operated vent valve 106. Water line 100 is also provided with a venturi tube 107 and an air inspirating line 108 which supplies air through check valve 109 to the tank to replace the gases discharged through the solenoid operated valve 106. In all other respects, the device of FIG. 4 operates in susbtantially the same manner as the device shown in FIG. 3.

I claim:

1. Apparatus for removing foreign gases from drinking water and comprising separator means, storage means, means for withdrawing water from the storage means according to demand for water and means providing for closed water and gas communication between said separator and storage means, means for supplying foreign gas laden water to said separator means, means for imposing superatmospheric pressure on the separator means, said separator means comprising means for breaking up said foreign gas laden water into minute water particles from which the vapor pressure of said foreign gas will discharge said gas at said superatmospheric pressure, a gas vent from said separator means and means for cyclically opening and closing said vent in timed response to the demand for water and including means responsive to the falling level of water in the storage means to open said vent and responsive to the rising level of water in the storage means to close said vent and means responsive to the opening of the vent to admit foreign gas laden water to the separator means and responsive to the closing of the vent to shut off admission thereof.

2. The device of claim 1 in which the means for opening and closing said vent comprises a valve having an actuator float in liquid communication with said storage means and responsive to the level of water in the storage means.

3. Apparatus for removing foreign gases from drinking water and comprising separator means, storage means, means for withdrawing water from the storage means according to demand for water and means providing for closed water and gas communication between said separator and storage means, means for supplying foreign gas laden water to said separator means, means for imposing superatmospheric pressure on the separator means, said separator means comprising means for breaking up said foreign gas laden water into minute water particles from which the vapor pressure of said foreign gas will discharge said gas at said superatmospheric pressure, a gas vent from said separator means and means for intermittently opening and closing said vent in timed response to the demand for water and including means responsive to the falling level of water in the storage means to open said vent and responsive to the rising level of water in the storage means to close said vent, said means for opening and closing said vent comprising an electrically actuated valve in said gas vent, and means for actuating said valve electrically and comprising a switch having actuating means responsive to the level of water in said storage means.

4. The device of claim 1 in which said separator means and storage means comprise a single unitary tank.

5. Apparatus for removing foreign gases from drinking water and comprising separator means, storage means, means for withdrawing water from the storage means according to demand for water and means providing for closed water and gas communication between said separator and storage means, means for supplying foreign gas laden water to said separator means, means for imposing superatmospheric pressure on the separator means, said separator means comprising means for breaking up said foreign gas laden water into minute water particles from which the vapor pressure of said foreign gas will discharge said gas at said superatmospheric pressure, a gas vent from said separator mean and means for intermittently opening and closing said vent in timed response to the demand for water and including means responsive to the falling level of water in the storage means to open said vent and responsive to the rising level of water in the storage means to close said vent, said separator means and storage means comprising separate tanks, said means providing for water and gas communication between said separator and storage means comprising separate lines interconnecting said tanks, said separator tank being at a higher level than the storage tank for gravity flow of gas free water from the separator tank to the storage tank.

6. Apparatus for removing foreign gases from drinking water and comprising separator means, storage means, means for withdrawing water from the storage means according to demand for water and means providing for closed water and gas communication between said separator and storage means, means for supplying foreign gas laden water to said separator means, means for imposing superatmospheric pressure on the separator means, said separator means comprising means for breaking up said foreign gas laden water into minute water particles from which the vapor pressure of said foreign gas will discharge said gas at said superatmospheric pressure, a gas vent from said separator means and means for intermittently opening and closing said vent in timed response to the demand for water and including means responsive to the falling level of water in the storage means to open said vent and responsive to the rising level of water in the storage means to close said vent, the means for supplying water to the separator means comprising a pump, said pump having control means responsive to the pressure in said separator means.

7. Apparatus for removing foreign gases from drinking water and comprising a storage tank, means for withdrawing water from the storage tank according to the demand for water, a separator tank, closed gas and water connections between said tanks, means for supplying foreign gas laden water to said separator tank, means for imposing superatmospheric pressure on the separator tank, means for breaking up said gas laden water into minute particles from which the vapor pressure of said gas will release said gas at said superatmospheric pressure, a vent for releasing gas from said separator tank to the atmosphere and means responsive to the falling and rising level of water in the storage tank for respectively opening and closing said vent for control of a cycle of operations of said apparatus in which gas is released through said vent from the separator tank to the atmosphere to reduce the pressure in the separator tank, foreign gas laden water is supplied to the separator tank before the pressure therein is completely relieved, foreign gas is released from the incoming water as it is broken up into minute particles and gas-free water is transferred from the separator tank to the storage tank.

8. The device of claim 7 in which the means for supplying water to the separator tank comprises a pump, the means responsive to the rising and falling level of water in the storage tank including pump control means responsive to the pressure within the separator tank.

9. The device of claim 8 in which the gas connection between the said tanks is sufficiently restricted to delay flow of gas free water from the separator tank to the storage tank.

10. The device of claim 7 in further combination with means for admitting air into said separator means in predetermined timed relation to said cycle.

11. The device of claim 10 in which the means last mentioned comprises a valve and control means for said valve coordinated with admission of gas laden water into the separator tank.

12. The device of claim 10 in which the means last mentioned comprises a valve and control means for the valve responsive to the level of water in the storage tank.

13. Apparatus for removing foreign gases from drinking water in cycles timed with respect to the demand for water and comprising separator means, storage means, means for withdrawing water from the storage means according to the demand for water, means providing closed water and gas communication between said separator means and storage means, means for supplying foreign gas laden water to said separator means, means for imposing superatmospheric pressure on the separator means, said separator means comprising means for breaking up said foreign gas laden water into minute water particles from which the vapor pressure of said foreign gas will discharge said gas at said superatmospheric pressure, a gas vent from said separator means and control means for a cycle of operations of said apparatus in which foreign gas laden water is admitted to the separator means, foreign gas is released therefrom and is discharged through the vent, and gas-free water is delivered to the storage means, said control means including means responsive to the demand for water withdrawn from the storage means and for initiating said cycle including the opening of said vent when the water level drops and for terminating said cycle including the closing of said vent when the water level rises.

References Cited in the file of this patent

UNITED STATES PATENTS

| | | |
|---|---|---|
| 1,910,088 | Cherry | May 23, 1933 |
| 2,037,245 | Leifheit et al. | Apr. 14, 1936 |
| 2,211,282 | McKeever | Aug. 13, 1940 |
| 2,899,013 | Carter | Aug. 11, 1959 |
| 2,948,352 | Walker et al. | Aug. 9, 1960 |

FOREIGN PATENTS

| | | |
|---|---|---|
| 263,830 | Great Britain | Nov. 10, 1927 |

UNITED STATES PATENT OFFICE

CERTIFICATE OF CORRECTION

Patent No. 3,070,935　　　　　　　　　　　　　January 1, 1963

Paul A. De Leon

It is hereby certified that error appears in the above numbered patent requiring correction and that the said Letters Patent should read as corrected below.

Column 2, line 70, before "valve" insert -- time --.

Signed and sealed this 25th day of June 1963.

(SEAL)
Attest:

ERNEST W. SWIDER
Attesting Officer

DAVID L. LADD
Commissioner of Patents